United States Patent [19]

Montalbano

[11] 3,995,543

[45] * Dec. 7, 1976

[54] COMPACTING APPARATUS

[75] Inventor: Anthony P. Montalbano, Freshmeadows, N.Y.

[73] Assignee: Constance Radice, Great Neck, N.Y.

[ * ] Notice: The portion of the term of this patent subsequent to Mar. 4, 1992, has been disclaimed.

[22] Filed: Mar. 4, 1975

[21] Appl. No.: 555,191

Related U.S. Application Data

[62] Division of Ser. No. 337,567, March 2, 1973, Pat. No. 3,868,903.

[52] U.S. Cl. .............................. 100/53; 100/229 A; 100/290; 220/65
[51] Int. Cl.² .................... B30B 1/18; B30B 15/14
[58] Field of Search ............. 100/100, 229 A, 290, 100/215, 53, 295; 220/65; 53/124 B; 141/316

[56] References Cited

UNITED STATES PATENTS

| 56,456 | 7/1866 | Seeberger | 100/229 R |
| 3,229,618 | 1/1966 | O'Connor | 100/229 R |
| 3,463,079 | 8/1969 | Corbett | 100/215 |
| 3,537,390 | 11/1970 | Hinkel | 100/100 |
| 3,589,277 | 6/1971 | Gray | 100/229 X |
| 3,726,211 | 4/1973 | Gladwin | 100/100 |
| 3,734,009 | 5/1973 | Engebretsen | 100/229 A |
| 3,734,340 | 5/1973 | Ippolito | 220/65 |
| 3,757,683 | 9/1973 | Engebretsen et al. | 100/229 A |
| 3,786,744 | 1/1974 | Miller | 100/290 X |

Primary Examiner—Billy J. Wilhite
Attorney, Agent, or Firm—Flynn & Frishauf

[57] ABSTRACT

A portable, rollable container unit is adapted to be removably received in a power unit. The units have means for positively guiding the container unit into the power unit and a ram in the power unit is operable to compact material in the container unit. The apparatus includes means responsive to the container unit being fully received in the power unit for enabling the ram unit and for inhibiting operation of the ram unit when the container unit is not fully received in the power unit. The container has an openable wall door section and means is provided for inhibiting opening of the door section of the container when the container unit is received in the power unit.

20 Claims, 11 Drawing Figures

COMPACTING APPARATUS

This is a division of application Ser. No. 337,567, filed Mar. 2, 1973, now U.S. Pat. No. 3,868,903, issued Mar. 4, 1975.

This invention relates to improvements in compacting apparatus, and more particularly to improvements in a portable compacting apparatus.

In many industrial situations, it is desirable to have a compacting apparatus of large capacity but which is compact in size, capable of being easily moved from place to place, and which may be easily and safely handled and operated by a relatively unskilled operator. Especially in commerical office buildings such a compactor would be advantageous for collection of trash at the end of each workday.

Therefore, the main objects of the present invention are to provide a portable compacting apparatus which is compact in size with large capacity, which is easily handled and operated, which is of relatively simple construction, which is flexible in utility, and which is safe to operate.

A further object of the present invention is to provide in such a portable compacting apparatus a unique configuration and drive arrangement which substantially reduces the excessive twisting or tilting of the ram which can occur in many of the known compacting systems. Such excessive twisting or tilting of the ram places undue stress on the support structure and imposes greater power requirements on the drive mechanism therefor.

A still further object of the present invention is to provide a completely self-contained compacting apparatus which is suitable for use with disposable bags, which carries its own supply of disposable bags, and which is capable of carrying at least one bag of compacted material, thereby improving the portability and utility of the apparatus.

SUMMARY OF THE INVENTION

According to the present invention, a portable compacting apparatus includes a power unit and a portable, rollable container unit which is adapted to be removably received in the power unit. The container unit is positively guided into the power unit and a ram unit in the power unit is operable to compact material in the container unit when the container unit is fully received in the power unit. Locking means is provided for locking the container unit into the power unit and means is provided for inhibiting operation of the ram unit unless the container unit is fully received in the power unit. The container unit has an openable peripeheral wall door section. The apparatus further includes means at least on one of the power and container units for inhibiting opening of the door section of the container unit when the container unit is received in the power unit.

Various other features of the invention will become apparent from the following description of the illustrated embodiment of the invention.

BRIEF DESCRIPTION OF THE DRAWINGS

FIG. 3a is a partial sectional view taken along the line III—III of FIG. 3 showing the mounting of the drive screws to the ram structure;

DETAILED DESCRIPTION OF PREFERRED EMBODIMENT

Figure 1:
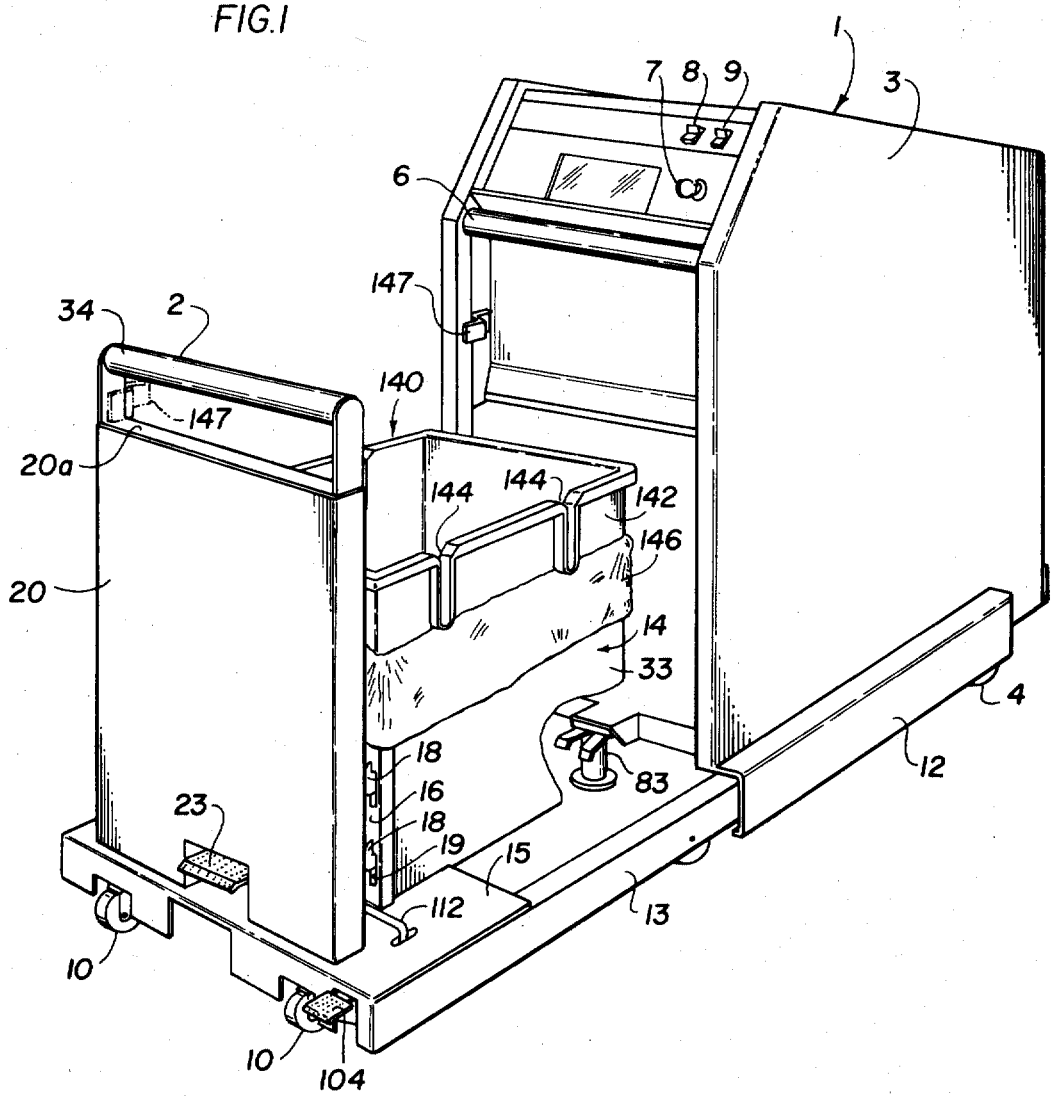
FIG. 1 is a front plan view of a compacting apparatus embodying the present invention.
Figure 2:
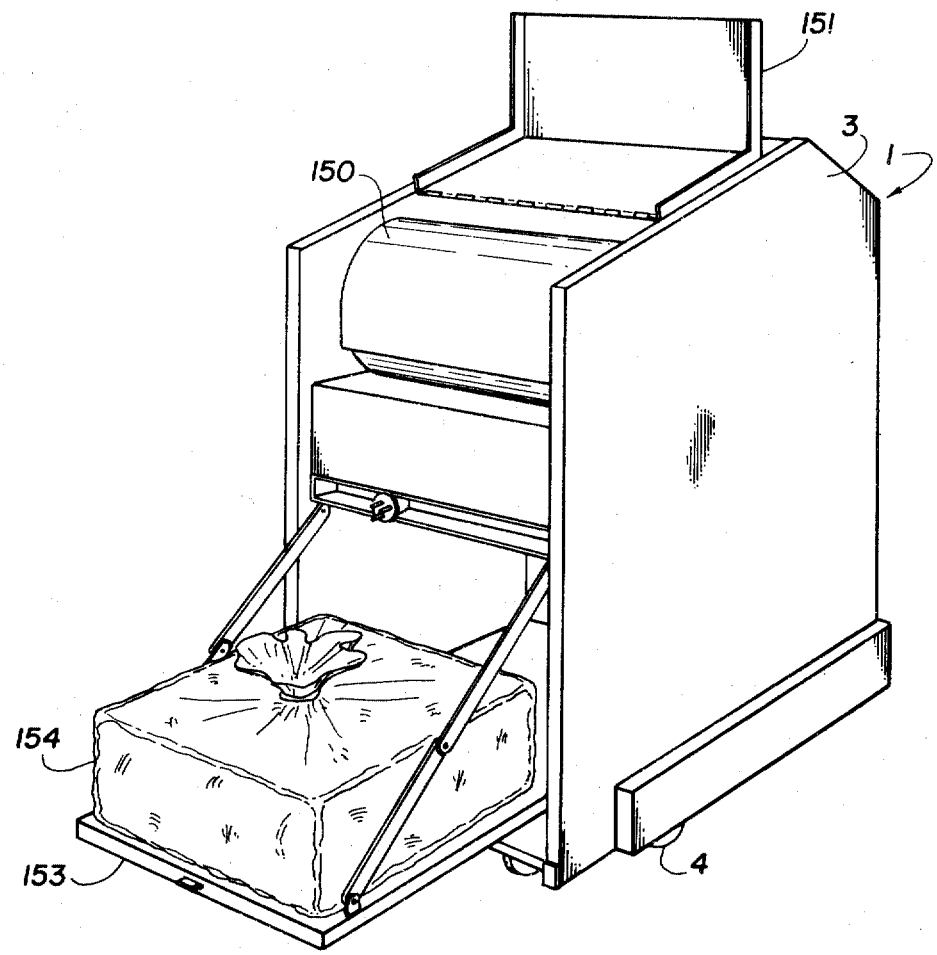
FIG. 2 is a rear plan view of the compacting apparatus of FIG. 1.
Figure 3:
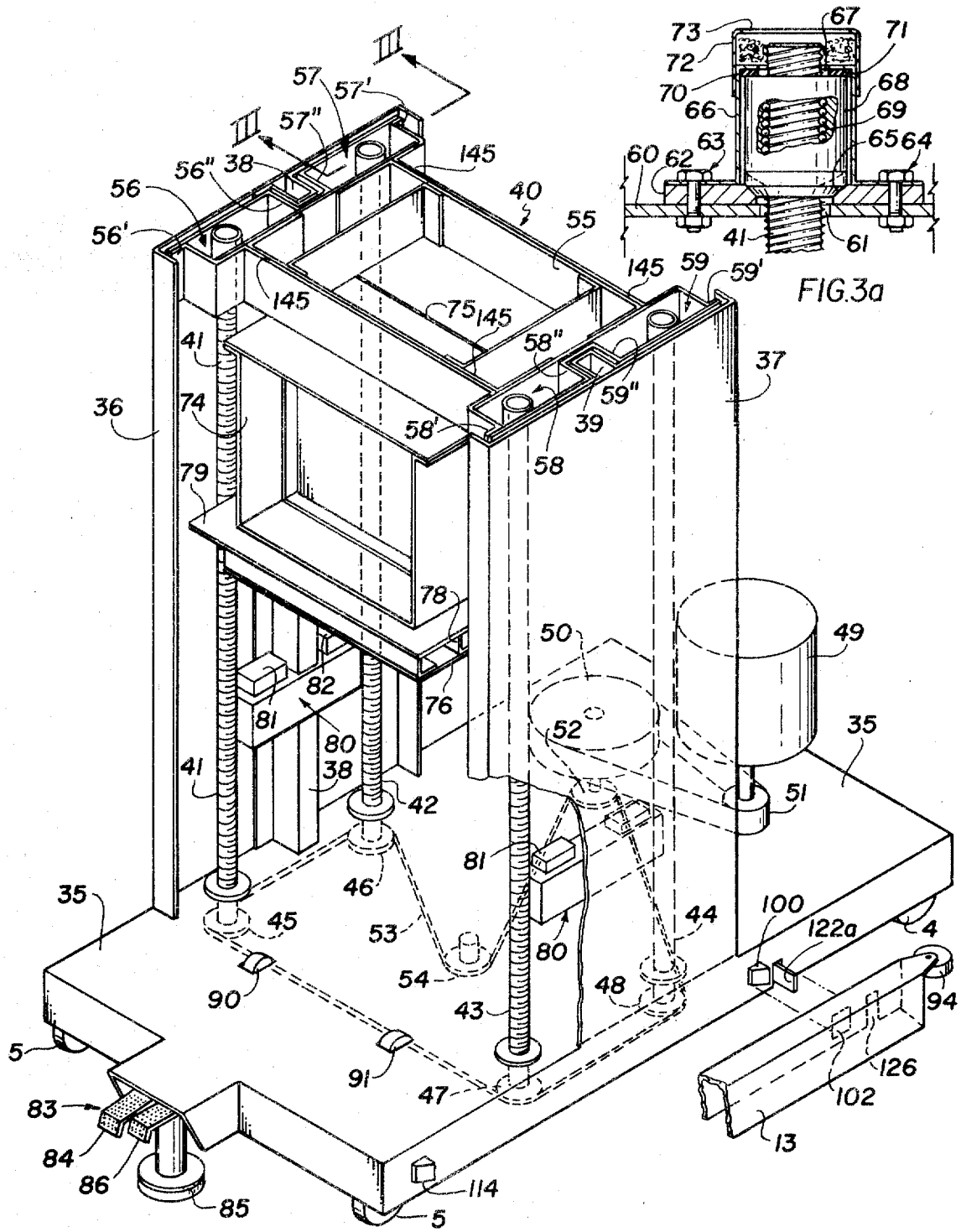
FIG. 3 is a perspective view of the internal drive and ram mechanism showing particularly the ram guides and the means for transmitting power from the screw drive elements to the ram structure.

Referring to FIGS. 1 and 2, the compacting apparatus of the present invention includes a portable power or compacting section 1 and a portable container module or section 2 which is rollable into and out of the outer housing 3 of the power section 1. Power section 1 is rollably supported by means of a pair of rear wheels 4 and a pair of swivel front wheels 5 (FIG. 3). Power section 1 includes a handle 6 thereon to facilitate movement thereof by an operator. An on-off key lock switch 7 is provided for safety reasons, and switches 8 and 9, which are interlocked with key lock 7 are provided for operation. Switch 9 controls the on-off mode, and switch 8 controls the ram movement. Switches 7, 8 and 9 are described hereinbelow with reference to the control circuit illustrated in FIG. 10.

The movable container section 2 is rollably supported by means of two front swivel wheels 10 (FIGS. 1 and 6) and a pair of rear wheels 11. The movable container section 2 is rollable into and out of the power section 1 and is guided into the power section 1 by extending guide members 12 of power section 1 which receive the horizontally extending members 13 and 13' (FIGS.1 and 4) of the movable container section 2.

Figure 4:
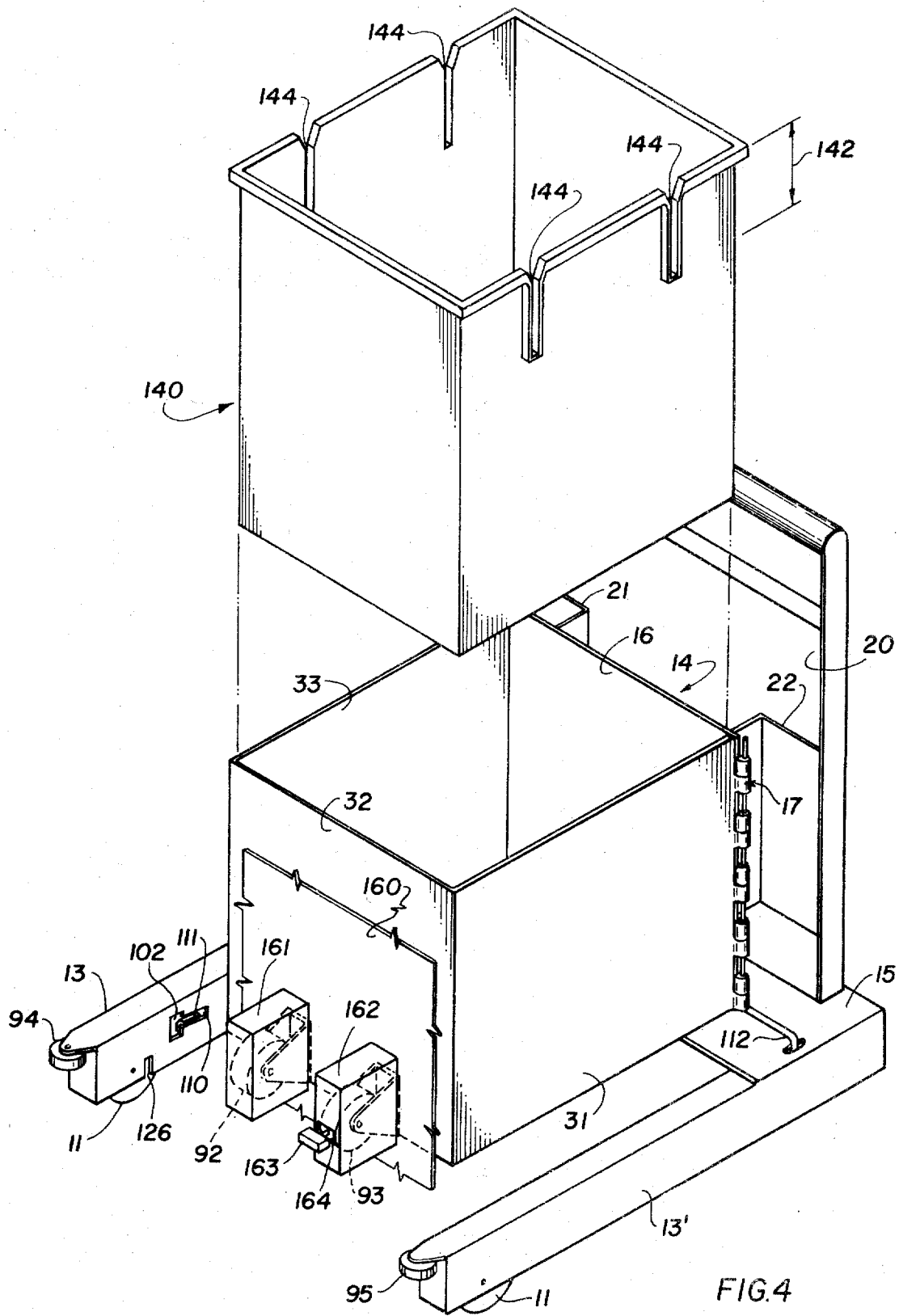
FIG. 4 is a plan view of the removable container mechanism used in the compacting apparatus of the present invention.
Figure 5:
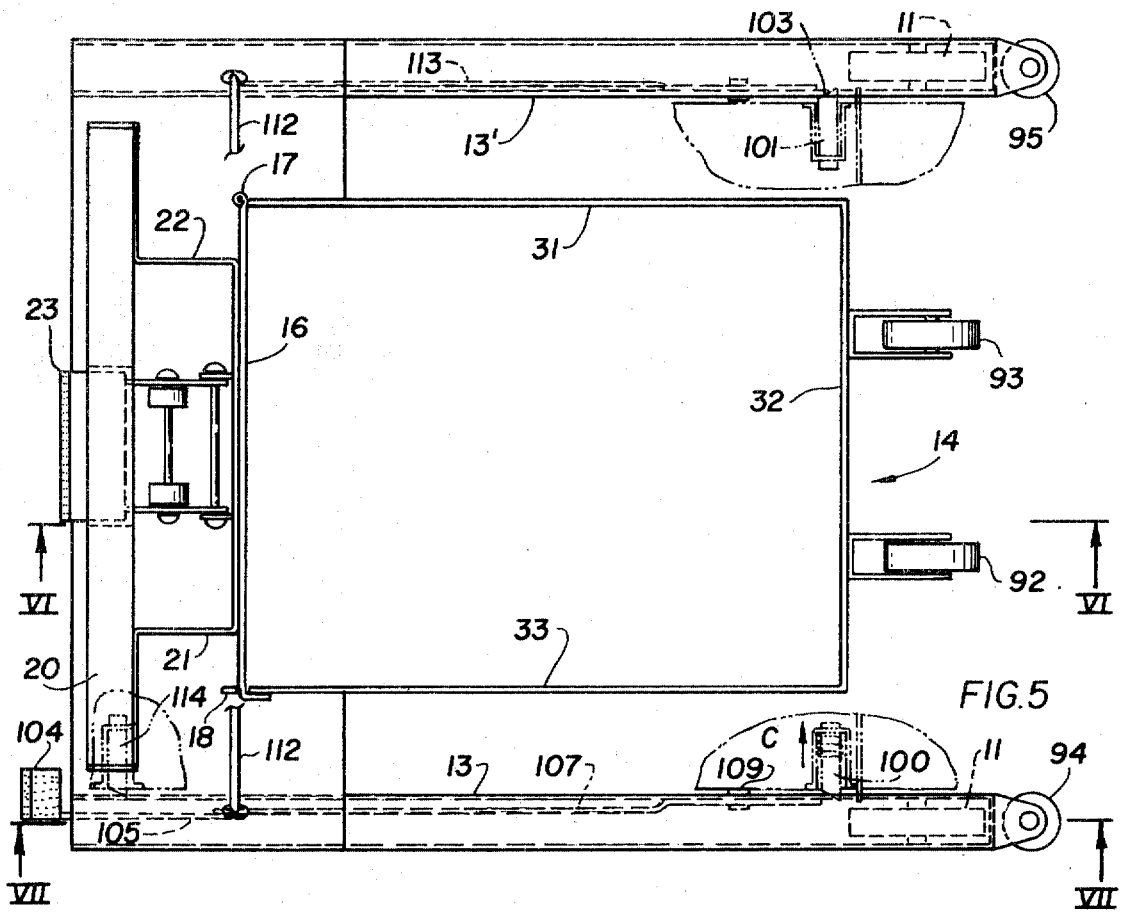
FIG. 5 is a top view of the movable container device of FIG. 4.

The movable container module 2 is of a cantilever type design with a compacting chamber or container 14 cantilevered from a member 15 which forms a part of the main frame of the container module 2 along with extending members 13 and 13'. The compacting chamber 14 is made of a rigid material, such as steel, and is of a generally rectangular configuration. The compacting chamber 14 includes three fixed walls 31, 32, 33 and an openable door 16. The door 16 is hingedly connected to the fixed container by means of hinge 17 (FIG. 4) and is locked in place by means of latches 18 which engage slots 19. Latches 18 extend, for example, from container wall 33. The door 16 is fixedly connected to an outer panel 20 by means, for example, of flanges 21 and 22 (FIG. 4). A handle 34 is carried by outer panel 20 for use in moving the container module 2.

Figure 6:
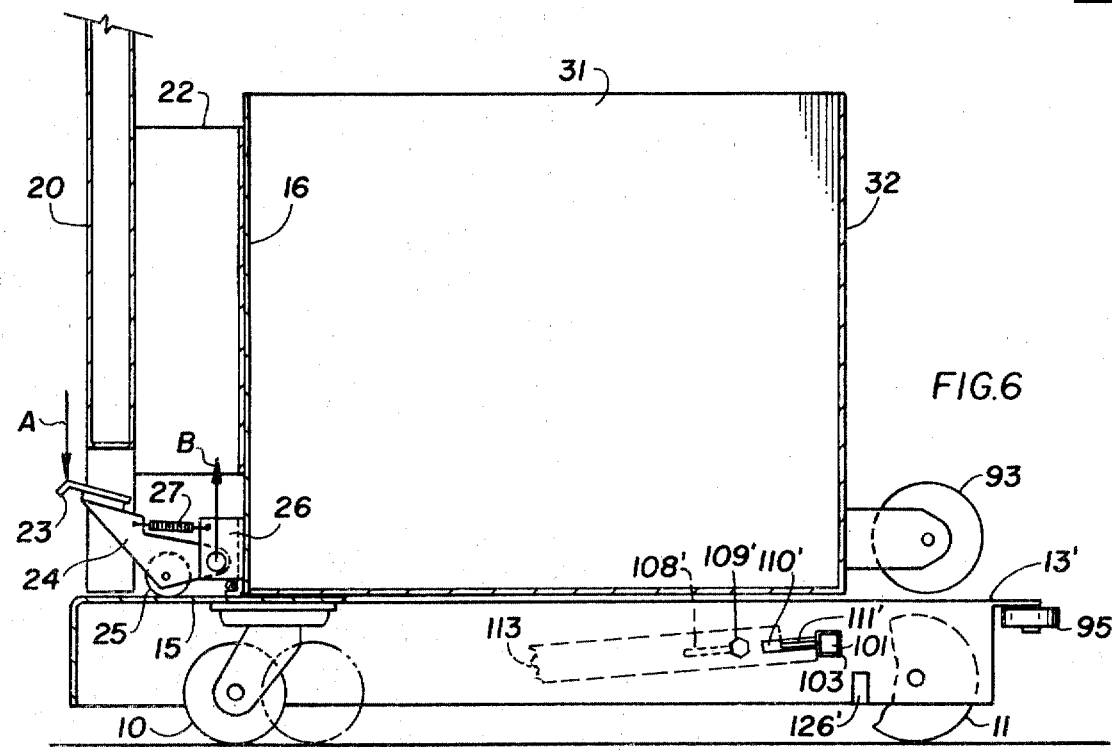
FIG. 6 is a side view of the movable container device of FIGS. 4 and 5, the side view being taken along the line VI—VI in FIG. 5.
Figure 7:
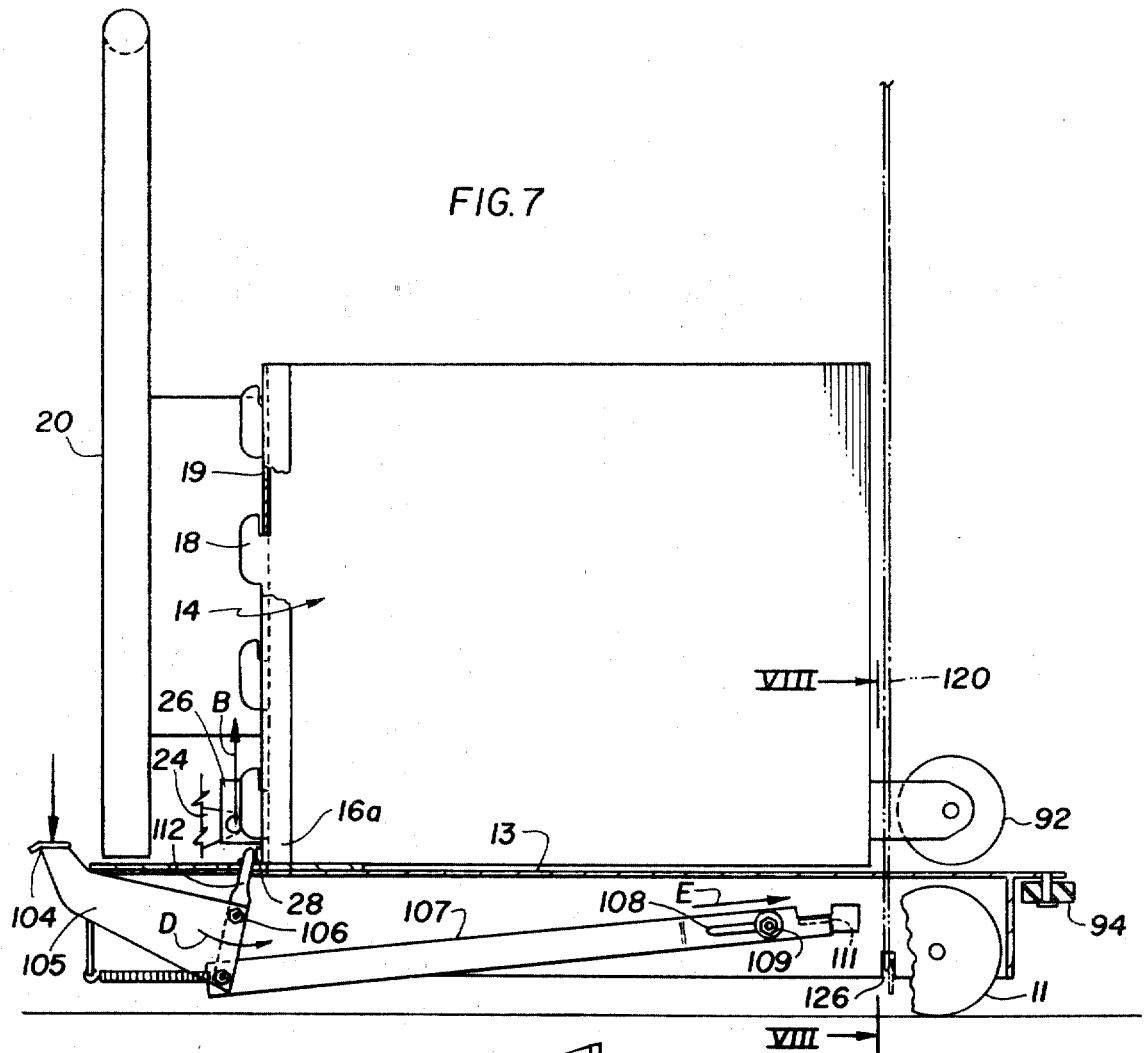
FIG. 7 is a side view taken along the line VII—VII of FIG. 5.
Figure 8:
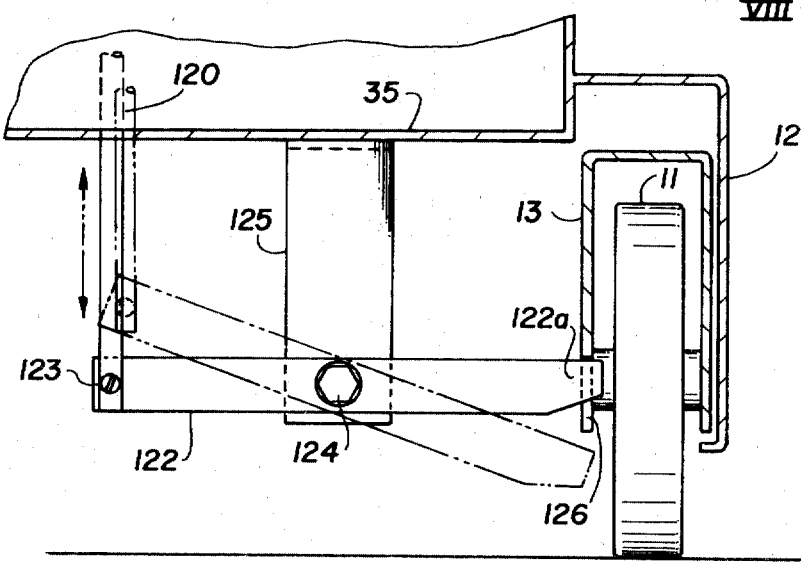
FIG. 8 is a view along the line VIII—VIII in FIG. 7 showing the locking mechanism in enlarged detail.

The door 16 is movable upwardly relative to the container 14 by means of the pedal 23 which is movable downward by the operator's foot in the direction of the arrow A in FIG. 6. Pedal 23 is connected to a lever mechanism 24 which has a wheel 25 secured thereto to act as a pivot point. Wheel 25 bears upon the base member 15 of the container module 2. Upon depression of the pedal 23 in the direction of the arrow A, the end of the lever mechanism 24 on the other side of the pivot wheel 25 moves upward in the direction of the arrow B shown in FIG. 6. Said other end of the lever 24 is connected to a bracket 26, which in turn is connected to the door 16, to lift same in the upward direction upon depression of pedal 23 so as to release the latches 18 from the slots 19. In the up position, the door 16 and panel 20 are together swingable outwardly from the container. Spring 27 biases the pedal 23 in the up or non-operative condition for maintaining the door locked. When the door is lifted to its up state, not only are the latches 18 released from the slots 19, but the lower end of the door 16a (FIG. 7) is lifted up and over a channel member 28 (FIG. 7). The door 16 then "rides" on the upper surface of the channel member 28 to its fully open condition. In the locked condition, the channel member 28 aids in retaining the door in position and acts as a "double" lock. Moreover, the channel member 28 aids in disengaging the slots 19 from the latches 18 since the channel member 28 will retain the door in its up position during movement thereof. The upper surface of the channel member 28 acts as a bearing surface during movement of the door 16 to its open position and thereby facilitates opening thereof. It should be clear that the hinge 17 is of such a design that it allows vertical movement of the door 16 relative to the fixed portions of the container 14. This may be accomplished by using a hinge having portions thereof removed, as illustrated in detail in FIG. 4.

Referring now to FIGS. 3 and 3a, the design of the ram structure and the support and drive mechanism therefor will now be discussed. Fig. 3 illustrates the internal structure of the power or compacting section 1, with the outer housing thereof removed. The power section 1 basically comprises a strong, rigid base member 35, preferably formed of metal, to which is secured vertical support members 36 and 37, for example by welding. Support structures 36 and 37 are illustrated in FIG. 3 as comprising channel-shaped members. Generally channel-shaped members 38 and 39 are secured to support structures 36 and 37, respectively, for example by welding. Channel members 38 and 39 serve as guides for the ram 40, which engages therewith. Extending vertically from the base 35 are four threaded rod members 41–44, each of which have drive gears 45–48 extending therefrom below the base 35. The threaded bars 41–44 are rotatably supported in the base 35. A motor 49 is mounted to the rear portion of the base 35 and is coupled to a drive pulley 50 by means of a belt 51. A typical motor for use in the present invention is General Electric Co. Motor No. G5KC45PG132, ¾ Hp with a built-in centrifugal switch, the function of which is discussed hereinbelow with reference to FIG. 10.

The drive pulley 50 is rotatably mounted in the base 35 and has a gear 52 extending therefrom below the base 35. A chain 53 engages all of the gears 45–48 and 52 for driving the threaded bars. An idler gear 54 is provided, the position of which may be adjustable so as to adjust the tension in the drive chain 53. An additional function of the idler sprocket 54 is to increase the "wrap" of the chain 53 around the gear 46. For best operation, it is desirable to have as large an angle of wrap of the chain around each gear as possible.

The threaded bars 41–44 are threadably engaged with the ram 40 as indicated in greater detail in FIG. 3a.

The ram 40 of FIG. 3 is a rigid structure which is threadably engaged with the threaded rods 41–44 at the upper end thereof. The upper end of the ram 40 comprises a box type structure 55 having box-type extending portions 56–59. The extending portions 56–59 are dimensioned such that the outer extremities 56'–59' form a close, slidable fit with the ends of the support channels 36 and 37. The inner portions 56"–59" are spaced such that pairs of the box-type members 56–59 cooperate to slidably engage around the channel members 38 and 39 which extend vertically to guide the ram structure. By virtue of this unique arrangement, the ram 40 is positively guided throughout its travel in such a manner that excessive twisting and bending of the ram structure relative to its support structure is avoided.

FIG. 3a illustrates the internal constuction of each of the rectangular box-type structures 56–59. The internal construction of FIG. 3a is obscured from view in FIG. 3. Referring now to FIG. 3a, within each structure 56–59 is a substantially horizontally extending plate 60 having an aperture 61 therethrough for passage of a threaded bar, for example bar 41. A plate 62 having a beveled opening 65 on its upper surface is secured to the plate 61 by means of screws and bolts 63 and 64. Further secured to the plate 60 by means of bolts 63 and 64 is an inverted cylindrical member 66 having an aperture 67 in its upper end for passage therethrough of bar 41. Inside of the inverted cylindrical member 66 is a ball race nut which threadably engages the bar 41, as indicated in FIG. 3a. The housing 68 of the nut contains a plurality of balls 69 which engage grooves within the nut 68 and which also engage the threads of the bar 41. The nut housing 68 is loosely mounted within the inverted cylinder 66 and has a beveled lower surface which movably engages the beveled surface 65 of the plate 62. As seen in FIG. 3a, by virtue of this arrangement, the nut housing 68 is able to be angularly displaced within the cylindrical housing 66 so as to enable the ram to tilt slightly relative to the drive screws 41–44 without binding the drive mechanism. Thus, more efficient driving is achieved and a lower horsepower can be used to drive the ram. A typical ball race nut is manufactured by Saginaw Steering Gear Div. General Motors.

Still refering to FIG. 3a, within the cylindrical housing 66 are resilient members 70 and 71 which tend to retain the nut 68 in a given position, but which are resilient enough to allow for movement thereof relative to the cylindrical member 66. A cover member 72 having an aperture 73 therein is provided and preferably contains a lubrication wick for lubricating the bar 41 as it passes therethrough.

By virtue of the unique construction of the ram and drive configuration of the present invention, most efficient use is made of the ball race nut since such nuts are best operated with the bar 41 in tension. In the present invention, during compacting when the ram 40 is being pulled downward, the bars 41–44 are in tension and therefore provide most efficient use of the ball race nut construction. Further, such an arrangement allows the drive mechanism to be relatively simple and compact, thereby leading to a more advantageous configuration of the compactor.

Below the box-type upper structure 55 of the ram, there is located another box-type structure 74 having a horizontally extending strengthening plate 75 mounted therein. Below the box-type structure 74 is the head of the ram 76 which comprises a plate in a plurality of horizontally extending support and strengthening elements 77, 78. It should be clear that the strengthening elements 77 and 78 could take any form. Interposed between the ram head 76 and the box-type structure 74 is a rubber or other flexible material sealing flap 79 which is dimensioned such that it acts as a scraper along the sides of the compacting container during compaction of material. The flexible scraper 79 is easily replaced by removal of the ram head structure 76.

A ram stop device 80 is secured to each side of the support structure 36 and 37 so as to prevent the ram from moving too far downwardly in the compactor. On the upper surface of the ram stop member 80, which preferably comprises sheet metal welded, for example, to the side supports 36 and 37, are rubber bumpers 81 and 82. It should be clear, however, that other types of ram stops may be used, as desired.

Further, in connection with the ram and drive configuration of the present invention, the provision of four threaded drive screws 41–44, each located at a respective corner of the ram 40, provides extremely efficient and positive drive of the ram. Such a configuration reduces twisting and bending of the ram during compaction to a minimum and effectively reduces the power requirements of the drive mechanism and enables thinner threaded rods 41–44 to be used. Thus, the compacting apparatus is enabled to be made more compact and the costs of the various components are reduced.

At the end of the power unit 1 at which the operator stands there is located a mechanism 83 for locking the compacting apparatus in a given postion during use. The locking mechanism 83 comprises a first pedal 84 for lowering a locking block 85 against the floor to lock the apparatus in position. A second pedal 86 is provided to release the locking mechanism upon depression thereof. The locking mechanism 83 is conventional and the operation thereof should be apparent. A typical locking mechanism is a Payson floor lock No. 558.

In use, the container section 2 is rolled into the outer housing of the power section 1 with the members 13 of the container section engaged by the portions 12 of the power section. In order to aid in engagement of the portable container section 2 with the power section 1, power section 1 includes a pair of rollers 90, 91 rotatably mounted therein and extending slightly above the upper surface of the base member 35. At the end of the container 14 are rotatably mounted a pair of additional rollers 92, 93. In addition, at the end of the support members 13 and 13' are mounted respective rollers 94 and 95. As should be apparent, rollers 92, 93 roll over the upper surface of the base members 35 of the power unit, and rollers 94, 95 engage the side surfaces of portions 12 of the power unit. These rollers cooperate to make it extremely easy to engage the movable container section 2 into and out of the power section 1. The various rollers are formed of a resilient material, such as medium hard rubber, so that during compaction the rollers become slightly compressed so that the forces of compaction are borne by the bottom of the container 14 bearing against the upper surface of the base member 35 of the power unit 1. If the rollers were not made of such resilient material, the forces of compaction would be applied to the rollers which would most likely become deteriorated in a short period of use.

Figure 9:
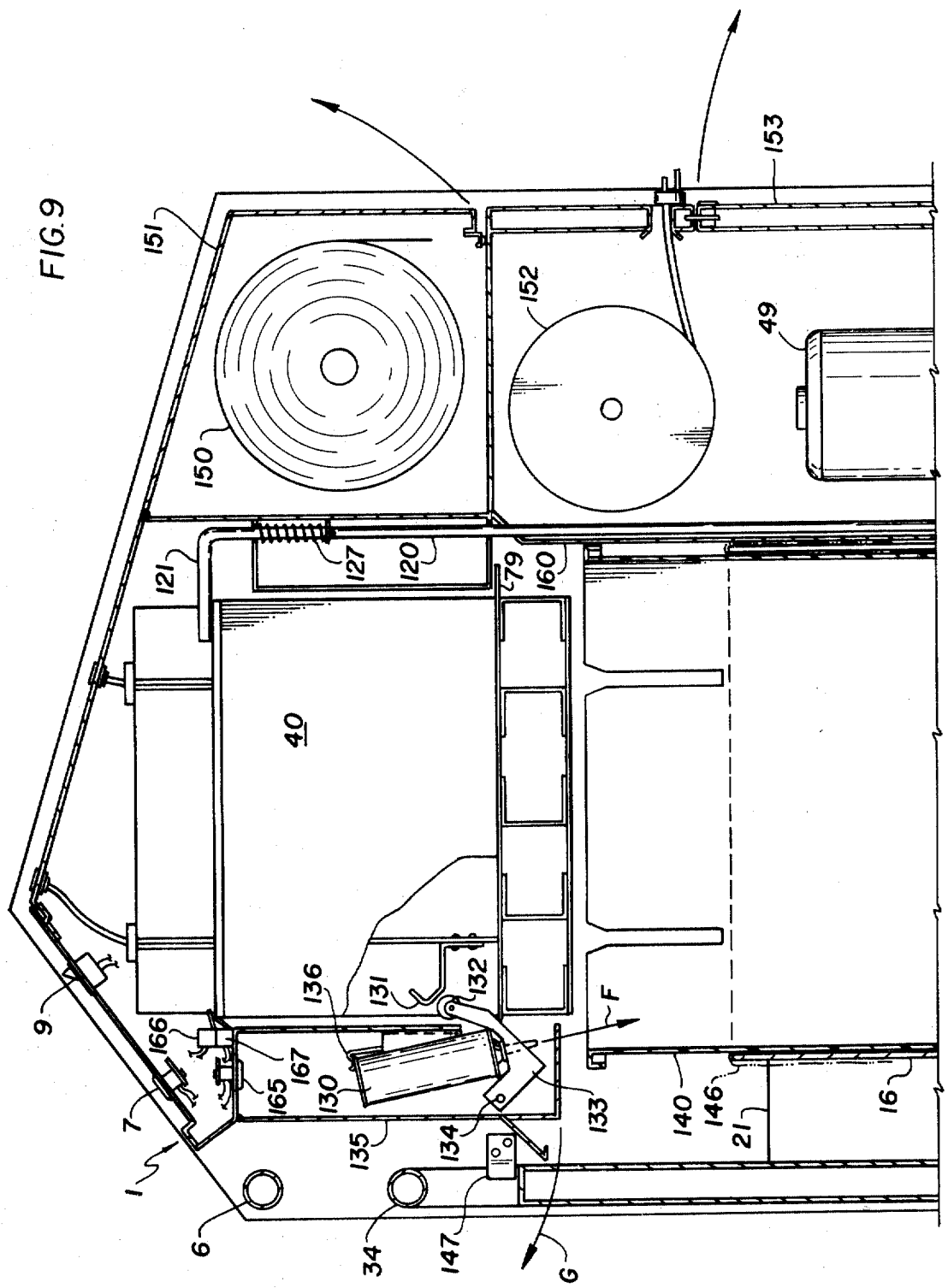
FIG. 9 is a side view of the inner portion of the upper part of the compacting apparatus shown in FIGS. 1 and 2.

In FIG. 4, the vertical plate 160 of the power unit 1 is shown. FIG. 9 shows the location of the plate 160 in better detail. Plate 160 has openings and receptacles 161, 162 extending inwardly therein within which the wheels 92 and 93 are received when the container unit 2 is pushed into the power unit 1. An electrical interlock switch 163 is mounted in the receptacle 162 which has a hole 164 therein. The operating lever of the switch 163 extends through the hole or aperture 164 and is actuated by the wheel 93 when the container section 2 is pushed into the power unit 1. The switch 163 is electrically interconnected in the electrical actuating circuit of the compactor so that the ram cannot be operated unless the switch 163 is actuated by a wheel 93. This is a further safety feature of the present invention. A discussion of switch 163 in connection with the circuitry of the compactor is given hereinbelow with respect to FIG. 10.

The switch 163 is mounted in the recess defined by the receptacle 162. This makes it still more difficult for an unauthorized person to operate the compactor without insertion of the container section 2. Also, if a child crawls into the compactor the provision of the switch 163 for receptacle 162 renders it more difficult for the ram to be inadvertently lowered.

For the purpose of safety, when the movable container section 2 is rolled into the power section 1, it becomes locked therein. The locking mechanism prevents disengagement of the units during compaction, thereby improving operator safety. The locking mechanism is shown, for example, in FIGS. 3, 5, 6, 7 and 8 of the drawings. Referring particularly to FIGS. 5–8, the lock mechanism comprises a slidable bolt 100 which is mounted to the base member 35 of the power module (see FIG. 3) so as to be movable in a direction substantially perpendicular to the direction of movement of the container section 2 when it is moved into and out of the power section 1. The bolt 100 is similar to the bolt used in a standard door lock. A similar bolt 101 is mounted to the base 35 of the container unit in a similar manner. Horizontally extending member 13 has an aperture 102 therein (FIGS 4 and 6) for receiving the bolt 100. A similar aperture 103 is provided on horizontally extending member 13' for engagement with bolt 101. As is apparent from FIG. 5, when the movable container section 2 is inserted into the power section, the free end of horizontally extending member 13 pushes the bolt 100 inward in the direction of the arrow C due to the inclined surface of the bolt 100 which engages the member 13. As the movable container section is further pushed into the power section, the bolt 100 engages the aperture 102 and, due to spring loading, is forced into the aperture to lock the power and movable sections 1 and 2, respectively, together. At the same time, bolt 101 engages aperture 103 in a similar manner.

In order to release the movable container section 2 from the power section 1, a pedal 104 coupled to a release mechanism is provided. The release mechanism is most clearly shown in FIG. 7. The pedal 104 is secured to a lever arm 105 which is pivotally connected to the horizontally extending member 13 by means of, for example, a bolt 106. Rivets, or the like, could also be used. The lever arm 105 is connected to an arm 107 which has a slot 108 at one end thereof which is slidably connected to the horizontally extending member 13 by means of, for example, bolt 109. The remote end of arm 107 is bent over to form an angle (see FIG. 6), the bent over portion 111 being engaged in a slot 110 formed in the horizontally extending member 13. In order to release the bolt 101 which engages the horizontally extending member 13', a bar 112 (FIGS. 5 and 7) is connected to the lever 105 and extends horizontally across the container member 1 to engage an arm 113 which is similar to arm 107.

In order to release the movable container section 2 from the power section 1, the pedal 104 is depressed, thereby pivoting the lever 105 in the direction of the arrow D (FIG. 7). This causes the arm 107 to move in the direction of the arrow E (FIG. 7), thereby causing the bent over end 111 to move in the direction of the arrow E to force the bolt 100 against its spring bias away from the horizontally extending member 13. Similarly, the arm 113 on the other side of the movable container section 2 operates to release the bolt 101 from horizontally extending member 13'. Then, the movable container section 2 can be withdrawn from the power section 1 by the operator. After the container section 2 is moved out of engagement with the bolts, the foot pedal 104 can be released.

As a further safety feature, an additional bolt 114 (FIG. 5) is provided at the end of the base 35 of the power section 1. A similar bolt is provided on the other side, and is not shown in the drawings. For convenience, bolt 114 is only shown in FIG. 5. Upon withdrawal of the container section 2, the bolt 114, and its counterpart on the opposite side, will engage the apertures 102 and 103 of members 13 and 13', respectively. This prevents the container section from being inadvertently moved too quickly out of the system. In this position wherein the bolts 114, and its counterpart, locks with the movable container, the container section 14 can be loaded by an operator. After loading, the container section 2 can then be pushed completely into the power section for operation of the compactor. However, if it is desired to completely remove the container section 2 from the power section 1, when bolt 114 engages section 13, all that is necessary is for the operator to again depress pedal 104 so as to release bolt 114 from the engaging aperture 102 as described above in connection with bolts 100 and 101. This positive secondary locking feature is important for safety and convenience of operation of the apparatus.

While the above locking arrangement is positive and secure, for further safety an additional locking arrangement is provided which becomes activated when the ram 40 is lowered for compaction. Referring to FIG. 9, an elongated bar member is slidably mounted in the power section 1 and includes a bent over section 121 which engages an upper surface of the ram 40. The lower section of the bar 120 is pivotally connected to a latch member 122 by means of a bolt or rivet 123. Latch member 122 is pivotally connected at a fixed pivot point 124 to a member 125 which extends from the lower surface of the base 35 of the power section 1. The end 122a of the latch 122 selectively engages a slot 126 in the horizontally extending member 13 when the latch member 122 is pivoted in the counterclockwise direction referring to FIG. 8. When the ram 40 is in its fully up position (as shown in FIG. 9), the bar 120 is raised to its uppermost position, thereby lowering the free end 122a of latch 122 to its lowermost position wherein it is disengaged from the horizontally extending member 13 of the movable container section 2. When the ram 40 is lowered, during operation or for any other reason, the bar 120 is caused to lower due to the action of spring 127 (FIG. 9) so as to cause the latch 122 to pivot in the counterclockwise direction so as to engage slot 126 of member 13 of the container section 2. In this manner, during operation of the ram, the container section 2 and the power section 1 are further locked together by means of a second lock, thereby enhancing the safety of the overall system.

In accordance with the further feature of the invention, an aerosol can of deodorant and/or disinfectant 130 is mounted within the power section 1 (FIG. 9) and is activated by means of a member 131 on the ram 40 so as to spray a given amount of the contents of the can 130 on the surface of the material in the compacting chamber when the ram is operated at its uppermost position. In operation, the ram member 131 engages the roller member 132 carried by a pivot arm 133 to actuate the spray can. When member 131 engages the roller 132, the pivot arm is caused to rotate in the counterclockwise direction about pivot point 134 to cause material to be sprayed out of the can 130 as indicated by the arrow F.

The can 130 is located within a housing in the power section 1 and is accessible for replacement by means of a door 135 thereon which is openable in the direction of the arrow G (FIG. 9). A clip 136 is provided within the housing to retain the can 130 in position.

The movable container section 2 incorporates a liner similar to that disclosed and claimed in U.S. application Ser. No. 171,711, filed Aug. 13, 1971, now U.S. Pat. No. 3,734,346 issued May 22, 1973. The contents of this copending application are incorporated herein by reference.

Referring to FIG. 4, the liner construction of the present invention is illustrated in greater detail. The liner 140 is of generally rectangular shape and is made of a substantially rigid, but flexible material, such as polyethylene. The liner 140 is preferably fabricated as an integral structure, but it may be fabricated of several pieces jointed together.

The upper portion 142 of the liner 140 extends above the upper level of the compacting chamber 14. In this connection, see FIG. 1 wherein the liner 140 is shown inserted into the compacting chamber 14. The upper portion 142 of the liner has slots 144 formed therein. The slots are located so that when the ram 40 is lowered to its lowermost compacting position, the portions 145 of the ram which connect the ram head to the drive structure pass through the slots 144 in the upper portion of the liner. When a container is loaded with material to be compacted, the material which is above the upper level of the compacting chamber 14, but which is below the upper level of the liner 140, is not subjected to great compacting pressure. Therefore, the upper portion 142 of the liner is provided so that the container may be advantageously loaded and so that the compacting action which causes greater compacting forces in the portion defined by the compacting chamber 14 are efficiently used. In compacting material, it is desired to have a large free space at the upper portion of the compacting chamber for accepting material to be compacted. On compaction, however, only a smaller portion of the compacting chamber will be effectively utilized. If the compacting chamber 14 were extended to reach the upper level of the liner 142, then the amount of metal and other high strength components would be increased. In addition, the overall height of the compactor would be increased, thereby increasing the cost of the system and increasing the weight and difficulty of handling of the movable container. Since the slots 144 are relatively narrow, it has been found that there is no danger of refuse or other material to be compacted from falling out of the liner through the slots. As mentioned above, the slots in the upper portion of the liner are provided so that the ram may pass therethrough and compact the material within the chamber 14 so as to provide more efficient utilization of component materials. Slots 144 in the liner 140 afford the main advantage of greater effective compaction chamber capacity while minimizing overall height of entire compactor. This is a very important feature of the invention.

As described in said U.S. Pat. No. 3,734,430, a plastic or other disposable bag 146 is located between the outer chamber 14 and the liner 140. See FIG. 1. In accordance with the teachings of said U.S. Pat. No. 3,734,430, the liner 140 is bottomless. After compaction, the door 20 is opened by depression of the pedal 23, thereby opening the door 16 to the compaction chamber 14. This effectively releases some pressures built up on the liner and enables the liner 140 to be easily lifted out of the compacting chamber 14. Thus, the compacted material will remain in the plastic or other disposable bag 146, which can then be tied and easily removed from the apparatus.

A further safety feature of the present invention is the provision of an additional locking member 147 on the housing of the power section 2 which prevents the door 20 from being opened when the container section 2 is locked into the power section 1. The lock 147 is illustrated best in FIG. 1. When the container section 2 is engaged into the power section 1, the lock member 147 is located above the upper surface 20a as shown in dashed lines in FIG. 1. This prevents the door 20 from being raised by depression of the pedal 23 when the power and movable sections of the compacting apparatus are engaged.

A further feature of the compacting apparatus is the provision in the rear portion of the power section 1 of a compartment for storing a roll of plastic or other type of disposable bag for use with the compacting device. As shown in FIGS. 2 and 9, a roll of such disposable bags 150 is mounted in the rear compartment which is covered by an openable cover 151. Below the roll of bags 150 is a power cord stored on a reel 152. The power cord may be reeled out, as desired, and then, after use of the compacting apparatus, may be reeled back into the storage chamber due to the spring action of the reel. This is an extremely conveninet arrangement and enhances the portability of the compacting apparatus.

Also, at the rear end of the power unit 1 is located a drop shelf 153 which may be lowered for storage of bags of compacted material. See, for example, FIG. 2 wherein one bag 154 of compacted material is shown on the open shelf 153. When the portable compactor of the present invention is used in large installations, such a self-storage feature of bags of compacted material is extremely important and enhances the efficiency of utilization of the compactor. This eliminates the need for collection of compacted bags of material throughout the premises.

When a portable compacting apparatus of the type of the present invention is used in various locations, in many instances the floor on which the unit is used is not level. The floor may be wavy or contain various portions which are uneven. By virtue of the roller guide mechanisms of the present invention which include rollers 90 and 91 on the power section and rollers 92, 93, 94 and 95 (FIG. 4) on the movable container section 2, the insertion of the movable section 2 into the power section 1 is facilitated even if the floor is not level. For example, if the container section 1 is rolled down an inclined section of the floor toward the power section 1, the rollers 92, 93 will engage the upper surface of the base 35 of the power section to facilitate engagement. Also, the rollers 94 and 95 facilitate alignment and accurate insertion of the movable container 2 into the power section 1 with a minimum of difficulty.

Figure 10:
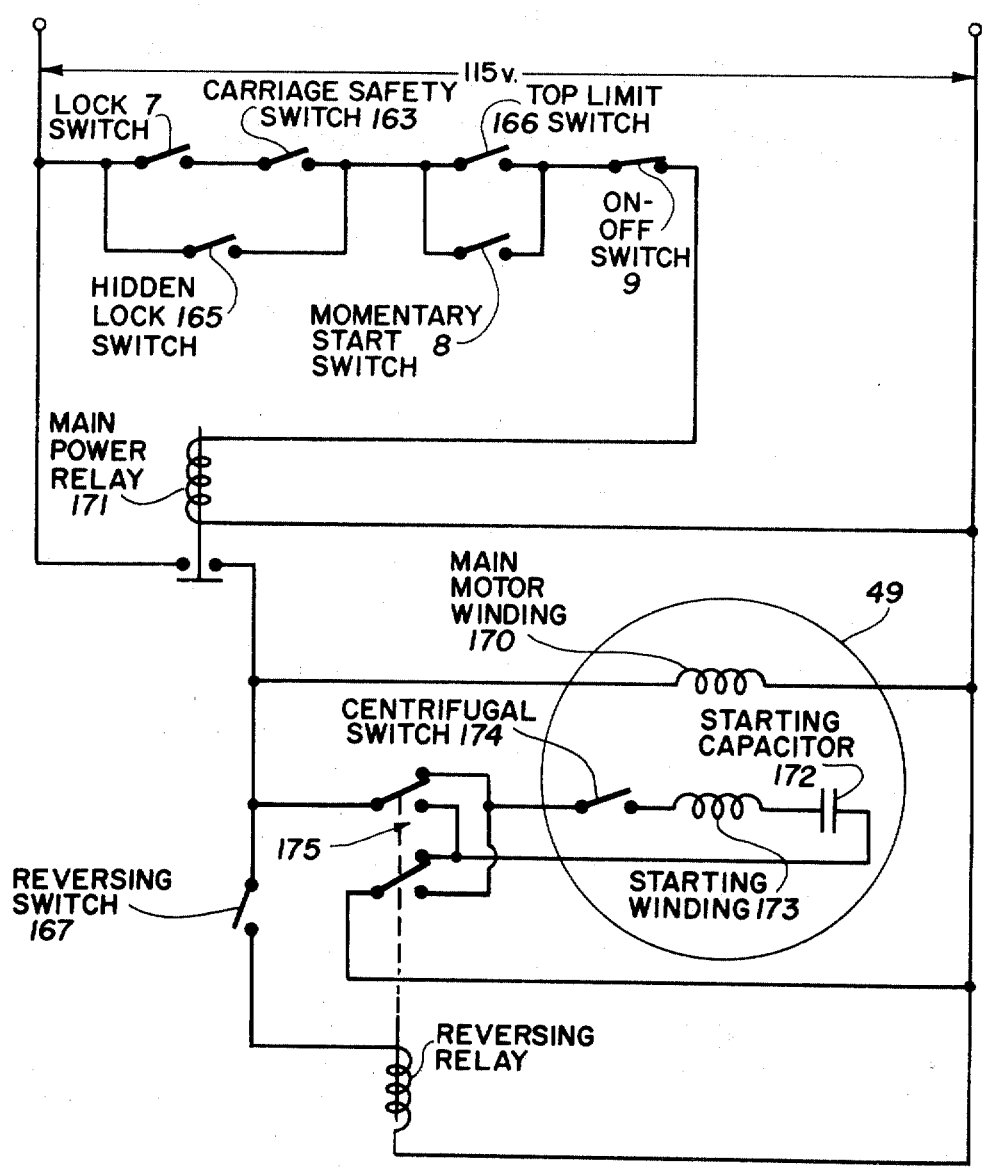
FIG. 10 is a schematic diagram of a control circuit for the compacting apparatus.

Referring to FIG. 10, there is shown the electrical control and operating circuit for a compactor of the present invention. The lock switch 7 and switches 8 and 9 are illustrated in FIG. 10, as well as safety switch 163. Also provided in the apparatus in a top limit switch 166 which is ram activated as illustrated in FIG. 9. When the ram reaches its uppermost permitted position, the ram actuates the operating lever of switch 166 to effectively cut-off the main power. Also provided is a hidden lock switch 165 (FIG. 9) which is hidden in the compartment which holds the spray can 130. The hidden lock switch 165 is incorporated into the circuit of FIG. 10 such that the operator of the apparatus can turn on the hidden lock switch with a key and then operate the ram (for example for testing or cleaning purposes) without the necessity of having the container module located inside the power unit.

As shown in FIG. 10, the motor 49 includes a main motor winding 170 which is connected across the main power supply by means of a main power relay 171 upon actuation of the proper combination of switches in the control circuit. The motor 49 further includes a starting capacitor 172, a starting winding 173 and a centrifugal switch 174, all of which are connected in series. This series connection of elements is connected to a reversing relay 175 which is actuated by a reversing switch 167 which is ram activated (FIG. 9). The reversing switch 167 is located so as to be operated when the ram is in a slightly lower position than the position for actuating top limit switch 166. As the ram is lowered, first the top limit switch closes and then after the ram lowers slightly further, the reversing switch closes. The operation of the circuit of FIG. 10 is described in more detail below.

With power off, the compacting unit 2 is pushed in place into the power unit 1. The compactor ram 40 is in its upper position with both the top limit switch 166 and the reversing switch 167 in the open position as shown in FIG. 10. Then, power is turned on by means of turning on the lock switch 7 and operating the on-off switch 9. With power on, the unit is activated by pressing the momentary start switch 8. This provides power to the main power relay 171 and causes the motor 49 to operate to move the ram downward. As the ram begins its initial downward movement, the top limit switch 166 closes, thereby allowing the operator to release the momentary start switch. Then, the reversing switch closes activating the reversing relay 175. However, no reversal of the ram movement occurs since the motor centrifugal switch is open during rotation of the motor shaft. The ram 40 continues its downward movement and operates to compact material in the container.

When compaction is completed, that is, when the ram is driven against the ram stop 80, the motor rpm's decreases, thereby causing the centrifugal switch 174 to close. This results in causing an upward movement of the ram since the reversing relay 175 was previously actuated by means of the reversing switch 167. At the top of travel, the ram 40 will first contact the reversing switch 167 to cause same to open. The ram continues its upward movement until top limit switch 166 is activated, thereby automatically shutting the unit off.

An advantage of the ram stop 80 in connection with the circuitry and construction of the present invention is that as the ram 40 contacts the ram stop 80, the motor slowly begins to slow down. As the motor slows down, the centrifugal switch 174 therein operates to cause the direction of rotation of the motor to be reversed. Thus, the motor is thrown into reverse when it is operating at a relatively low rpm. This reduces the strain and electrical requirements placed on the motor. If a conventional type of sensing arrangement were used for sensing the bottom of travel of the ram, the motor would be thrown into reverse when it is operating at a relatively high speed, thereby imparting unnecessay wear and tear on the motor arrangement. With the present invention, a smooth transitional and reversing operation is achieved while imparting minimum wear on the motor and drive chain.

The hidden lock switch 165 is used only for maintenance operations when the ram must be partially or fully lowered with the carriage or container section 2 removed from the power section 1.

Various other types of control circuits may be used in connection with the compacting apparatus of the present invention. The above-described control circuit illustrated in FIG. 10 has been found to be advantageous and has been described by way of example.

An important constructional feature of the apparatus of the present invention is the "cantilever-type" construction of the portable container unit. This type of construction allows the unit to be fully inserted into the power unit so as to enable the overall apparatus to be more compact. The forces of compaction are borne by the base plate 35 of the power unit.

A further important advantage of the slots 144 in the liner 140 is that these slots facilitate setting up of the container unit with a disposable bag. For example, in setting up the unit for use, it is necessary to insert the liner 140 into a disposable bag 146, such as a plastic bag. In the case of plastic, the bag 146 is somewhat limp and could be difficult to handle. In accordance with the present invention, the liner 140 is mounted on the upper edge of the container 14 with the upper edge of the container engaging slots 144 on opposing walls of the liner. Thus, the slots of the liner saddle the chamber wall with the liner in an inverted position. Then, the bag 146 is easily applied over the liner 140. Then, the liner 140 with the bag therearound is inserted in the container 14 resulting in the configuration illustrated in FIG. 1.

It should be clear that various aspects of the present invention are suitable for use in any type of compacting system, whether it be a portable system or a substantially permanently installed system. For example, the locking mechanism by means of which the openable door section 20 is maintained in the closed position when the container unit is fully received in the power unit is equally applicable for use with systems in which the power unit is not portable as in the embodiment described hereinabove. Moreover, the outboard connected screw drive arrangement using the elongated screws operated in tension is equally usable in compacting systems other than the portable system described herein. The screw drive arrangement preferably includes four screws spaced at around the corners of a rectangular shaped ram. Still further, the slotted liner which provides intercourse between the ram and the liner during compaction is particularly advantageous and is useful in compacting systems other than portable compacting systems.

While the invention has been described herein in connection with specific apparatus, it should be clear that various modifications and alterations can be made to the design thereof within the scope of the invention as defined by the appended claims.

I claim:

1. A compacting apparatus comprising:
   a power unit; and
   a container unit adapted to be removably received in said power unit;
   said power unit comprising:
      means for receiving said container unit in said power unit;
      a ram unit operable to compact material in said container unit when said container unit is received in said power unit; and
   said container unit comprising:
      means for guiding said container unit into said power unit; and
      a container for receiving material to be compacted, said container being in registration with said ram when said container unit is received in said power unit for compaction of said material; and
   said power unit further including at least one resilient rotatable member mounted to the lower surface thereof said at least one resilient rotatable member being engageable with said container unit for facilitating reception of said container unit in said power unit, said resilient rotatable member yielding upon compacting of material in said container unit.

2. Apparatus according to claim 1 wherein said power unit includes a lower plate member and wherein said container unit is supported on said lower plate member during compaction of material by said ram unit.

3. Apparatus according to claim 1 wherein said ram unit includes:
   a ram, and
   means for selectively moving said ram in a vertical direction, said moving means including a plurality of elongated screw members, and
   said ram includes a plurality of ball race nut members spaced around the periphery thereof, said ball race nut members being threadably engaged with respective elongated screw members at said spaced points around the periphery of said ram.

4. Apparatus according to claim 3 wherein said ball race nuts are tiltable relative to said ram.

5. Apparatus according to claim 3 wherein said elongated screws are operated in tension during compaction.

6. Apparatus according to claim 1 wherein said receiving means of said power unit includes an elongated channel member for guiding and receiving said container unit.

7. Apparatus according to claim 6 comprising horizontally oriented rollable guide means on at least one of said power and container units for guiding said container unit in said channel unit of said power unit.

8. Apparatus according to claim 1 wherein said ram unit includes a peripherally driven ram and said container unit includes an outer container and an inner liner, said inner liner extending above the upper edge of said container and having vertical slots formed at least in said extending portion of said liner, said slots extending downward from the uppermost edge of said liner and being positioned so as to receive portions of said ram during downward movement of said ram.

9. In a compacting apparatus having a ram member which is peripherally driven and a container unit comprised of an outer container and an inner liner, the improvement comprising:
an inner liner extending above the upper edge of said container and having vertical slots formed at least in said extending portion of said liner, said slots extending downward from the uppermost edge of said liner and being positioned so as to receive portions of said ram during downward movement of said ram.

10. Apparatus according to claim 9 wherein said slots are positioned and dimensioned so as to additionally engage the upper edge of said container when said liner is in an inverted position for mounting a compacting receptacle over said liner.

11. In a compacting apparatus having a ram member which is driven in the vertical direction, the improvement comprising:
a plurality of elongated screw members located at respective spaced points around the periphery of said ram;
tiltable coupling means threadably engaging said elongated screw members with said ram member for allowing tilting of said ram member relative to said elongated screw members;
means for imparting rotation to said elongated screw members below the level of said ram to cause said screw members to pull said ram in the downward direction; and
a container having an inner liner extending above the upper edge of said container and having vertical slots formed at least in the extending portion of said liner, said container and liner being located relative to said ram with said elongated screws outside of the outer periphery of said container and liner, said slots extending downward from the uppermost edge of said liner and being positioned so as to receive portions of said ram during downward movement of said ram, thereby providing intercourse between said ram and liner during compaction of material.

12. Apparatus according to claim 11 wherein said ram is substantially rectangular, and comprising four of said elongated screws which are threadably engaged with said ram in the vicinity of the corners thereof by means of four respective tiltable coupling members.

13. A compacting apparatus comprising:
a power unit; and
a container unit adapted to be removably received in said power unit;
said power unit comprising:
means for receiving said container unit in said power unit;
a ram unit operable to compact material in said container unit when said container unit is received in said power unit; and
said container unit comprising:
means for guiding said container unit into said power unit; and
a container for receiving material to be compacted, said container being in registration with said ram when said container unit is received in said power unit for compaction of said material; and
said container unit further including at least one resilient rotatable member having a non-yieldably mounted axle mounted thereon, said at least one resilient rotatable member being engageable with said power unit for facilitating reception of said container unit in said power unit, said resilient rotatable member yielding upon compacting of material in said container unit.

14. Apparatus according to claim 13 wherein said receiving means of said power unit includes an elongated channel member for guiding and receiving said container unit.

15. Apparatus according to claim 14 comprising horizontally oriented rollable guide means on at least one of said power and container units for guiding said container unit in said channel unit of said power unit.

16. Apparatus according to claim 13 wherein said resilient rotatable member provides clearance between said power unit and said container unit when compaction is not taking place, said resilient rotatable member yielding upon compacting of material in said container unit.

17. Apparatus according to claim 16 wherein said power unit includes a lower plate member and wherein said resilient rotatable member of said container unit engages said lower plate member, said container unit being supported on said lower plate member when said resilient rotatable member yields during compaction of material by said ram unit.

18. Apparatus according to claim 16 wherein said resilient rotatable member is mounted on the rear wall of said container unit; and wherein said power unit includes a recess for receiving said resilient rotatable member; and switch means in said recess and coupled to said ram unit, said switch means being responsive to said container unit being fully received in said power unit for enabling said ram unit and for inhibiting operation of said ram unit when said container unit is not fully received in said power unit.

19. Apparatus according to claim 13 wherein said ram unit includes:
a ram, and
means for selectively moving said ram in a vertical direction, said moving means including a plurality of elongated screw members, and
said ram includes a plurality of ball race nut members spaced around the periphery thereof, said ball race nut members being threadably engaged with respective elongated screw members at said spaced points around the periphery of said ram.

20. Apparatus according to claim 13 wherein said ram unit includes a peripherally driven ram and said container unit includes an outer container and an inner liner, said inner liner extending above the upper edge of said container and having vertical slots formed at least in said extending portion of said liner, said slots extending downward from the uppermost edge of said liner and being positioned so as to receive portions of said ram during downward movement of said ram.

* * * * *